June 23, 1931.  M. I. PUPIN  1,811,368

TELEGRAPH SYSTEM

Filed Feb. 11, 1929

INVENTOR
MICHAEL I. PUPIN
BY *J. Hutchinson*
ATTORNEY

Patented June 23, 1931

1,811,368

UNITED STATES PATENT OFFICE

MICHAEL I. PUPIN, OF NORFOLK, CONNECTICUT, ASSIGNOR TO THE COMMERCIAL CABLE COMPANY OF NEW YORK, OF NEW YORK, N. Y., A CORPORATION OF NEW YORK

TELEGRAPH SYSTEM

Application filed February 11, 1929. Serial No. 339,213.

This invention relates to telegraphy and particularly to submarine cable telegraphy.

An object of the invention is to provide simple and effective apparatus for generating pulses of uniformly fluctuating current of either polarity. Its use in telegraph operation by what is known as the beat signal method will serve to illustrate the invention.

In telegraphing over submarine cables by the beat signal method, each block signal of greater than unit length is broken up into a series of short impulses each of which is followed by a curbing impulse during which the cable is earthed. If the impulses applied to the cable are square topped (such as an ordinary transmitter comprising a battery and key yields) they contain many high frequency components which make it difficult to balance the cable for duplex operation. In accordance with this invention an alternating electromotive force of the dot frequency to be transmitted is generated and applied at proper time intervals, by a suitably synchronized tape transmitting mechanism, to the grid of one or the other of two vacuum tubes. The anode circuits of the tubes contain two field windings of a direct current generator, the armature of which is connected to the cable circuit. The exciting currents of this transmitting generator are, therefore, the anode currents of the vacuum tubes and is a function of the potential applied to the grids of the tubes. By superimposing a constant voltage on the voltage supplied by the transmitting alternator to the grids of the tubes it is possible to transmit to the cable a fluctuating current which varies periodically between zero and a predetermined positive limit, when dots are to be transmitted. When dashes are to be transmitted the other winding on the direct current generator is excited and a current which varies between zero and a predetermined negative limit is transmitted to the cable.

Figure 1:
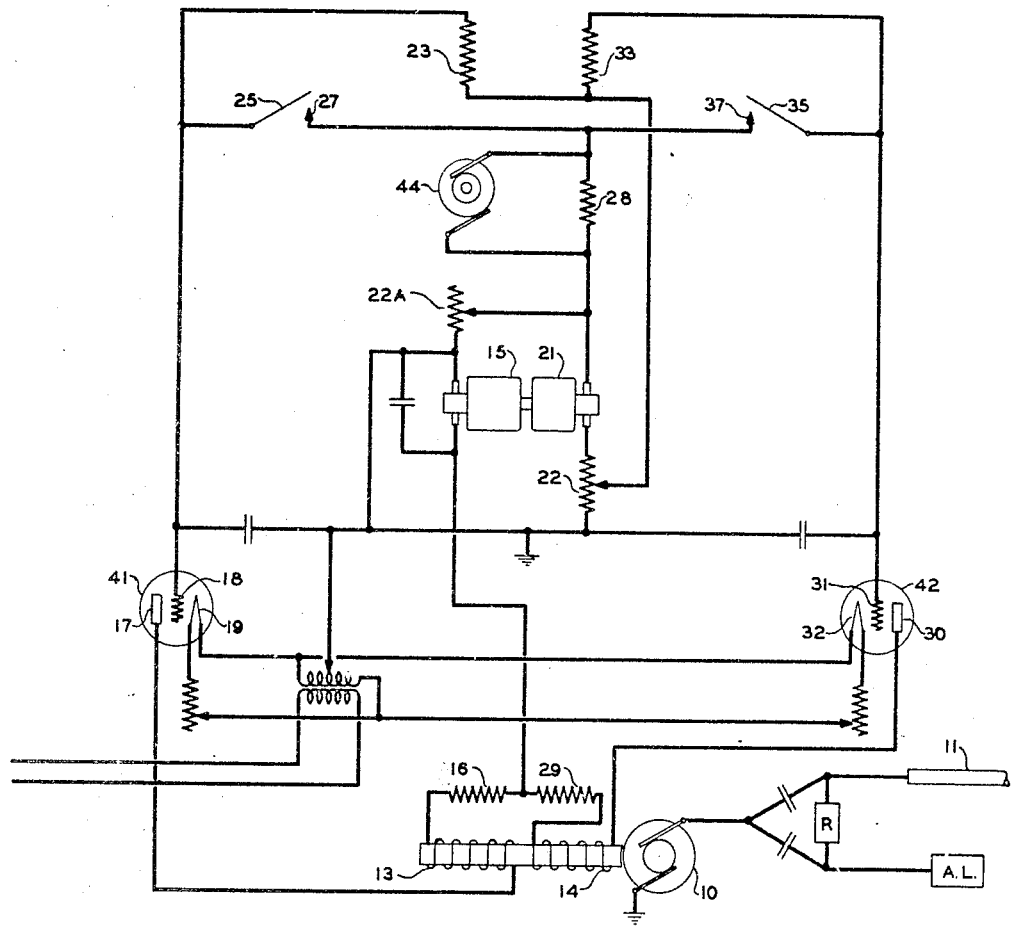
Figure 3:
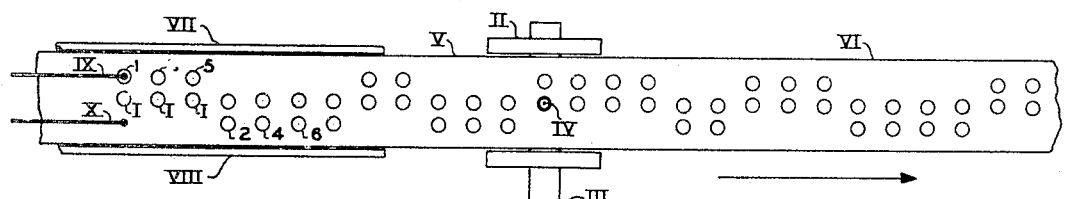

One embodiment of this application of the invention will now be described in detail in connection with the drawings, in which Fig. 1 represents schematically the necessary apparatus, Fig. 2 contains curves illustrating the operation and Figure 3 illustrates the method of obtaining synchronism between the automatic tape and the alternator.

In the drawings, a direct current generator 10 is shown with its brushes connected between ground and the transmitting apex of the duplex bridge of cable 11. The transmission of signals is controlled by varying the excitation of the generator field, which comprises two independent windings, 13 and 14. One terminal of each winding is connected, through a resistance 16, or 29, to the positive brush of a direct current generator 15. The other terminals of the windings are connected to the anodes 17 and 30 of vacuum tubes 41 and 42. The circuits are completed from the cathodes 19, and 32, of the tubes to the negative brush of generator 15 through a common ground connection as indicated. The anode currents of tubes 41 and 42 are controlled by varying the potentials of their respective grids 18 and 31. The normal grid circuit for each tube extends from the cathode 19 or 32, through the common ground connection, the lower part of resistance 22 and the adjustable contact thereon, through resistance 23 or 33, to grid 18 or 31 of tube 41 or tube 42. Resistance 22 forms part of a closed series circuit including a source of direct current 21 and a part of resistance 22a. The adjustable contact of resistance 22 is varied until the potential drop between the contact and the grounded end of the resistance is just sufficient to apply a negative potential to the grids of tubes 41 and 42, over the circuit traced, that will reduce the space current of the tubes to zero. Hence, neither field 13 nor field 14 is excited and no impulse is transmitted to the cable 11.

To transmit dot impulses brush 25 is depressed until it makes contact with 27. This shortcircuits the resistance 23, which, like resistance 33, is about one half of a megohm, and connects the grid 18 of tube 41, through resistance 28 shunted by alternator 44, and resistance 22a to the ground connection and filament 19 of the tube. Resistances 28 and 22a are so chosen that the positive potential (with respect to ground) across resistance 22a due to the current from generator 21 is half the amplitude of the alternating potential developed in resistance 28 by the current from alternator 44. Since these potentials are superposed between the cathode and grid of tube 41, the effective voltage applied to the cathode-grid circuit will vary between a negative maximum of one half the alternating potential across resistance 28, and a positive maximum of one and one half the alternating potential across resistance 28.

Figure 2:
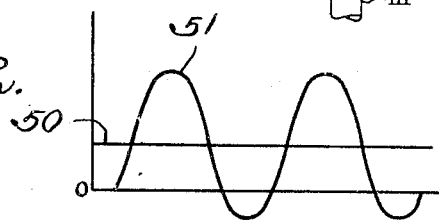

The resultant wave applied to the grid 18 of tube 41 is shown by curve 51 of Fig. 2. The constant potential developed across resistance 22a is indicated by curve 50. Assuming that the maximum negative potential of the wave indicated by curve 51 is just sufficient to block the space current of tube 41, the resultant anode current will be a pulsating direct current corresponding in general shape to curve 51. Since this current flows through field winding 13 a fluctuating direct current of the same general shape as curve 51 will be applied to the cable.

By varying the value of resistance 22a the value of the constant biasing voltage may be changed to control the shape of the wave applied to the cable.

To transmit dash impulses the brush 35 is depressed until it makes contact with 37. This energizes field winding 14 exactly as field winding 13 was energized under the control of brush 35. Since winding 14 is wound in a direction opposite to winding 13 the polarity of the dash impulses applied to the cable is opposite to that of the dot signals.

The transmitting brushes are operated by an automatic tape synchronized with alternator 44.

Synchronism between the automatic tape and the alternator will be explained by referring to Fig. 3. In this figure V, VI is a perforated tape driven by a rotating cylinder II whose shaft III is coupled to the shaft of the alternator.

Let the alternator 44, of Fig. 1, be a bipolar machine the armature of which makes, say, 10 revolutions per second, and let the reduction gear in the coupling between the two shafts be ten to one. Hence, for each ten revolutions of the alternator armature there will be one revolution of the cylinder II which drives the tape; during one revolution of the tape driving cylinder the tape will advance through a distance equal to the circumference of that cylinder. During this time interval the alternator generates ten complete cycles of the alternating electromotive force, and the tape should advance over a distance which contains ten perforations, like I, I, I, . . . , the distance between the centers of two consecutive perforations being equal to one tenth of the tape length moved by cylinder II during its complete revolution. Tape V, VI, with its perforations runs over a conducting plate VII, VIII, which represents conductor 27, 37 in Fig. 1. The upper row of perforations 1, 3, 5, . . . permits brush IX to make contacts with the conducting plate, and it is arranged that the time duration of this contact is a little longer than one half of the period of the alternating electromotive force. The same arrangement holds for the lower row of perforations 2, 4, 6, . . . and brush X under which they pass during the motion of the tape. The center row of perforations I, I, I, . . . is for the teeth of the cylinder II which drives the tape. Circle IV is one of these teeth. The distance between the centers of these perforations is the same as between the centers in the upper or in the lower row of perforations. Let there be ten teeth on the circumference of this cylinder, and let this circumference be so adjusted that these teeth will pass through the central holes as the cylinder II rotates and by its teeth drives the perforated tape. It is obvious then that the length of tape advanced during one revolution of cylinder II will be ten times the distance between the centers of two consecutive perforations. Since during one revolution of cylinder II the alternator generates ten complete periods of the alternating electromotive force it is obvious that each contact of brushes IX or X with the conducting plate VII, VIII will last a little more than half a period or any other phase-interval of the period of the fluctuating potential of the brushes IX or X. The phase-interval of the fluctuations at the beginning of which the contact starts and at the end of which it stops can be adjusted by shifting the contact brushes IX and X or by changing the phase of the impressed alternating electromotive force in any one of a number of well known ways. The adjustment having once been made will remain unchanged when the angular velocity of the alternator armature is changed and thus the frequency of the alternating electromotive force is changed. During each contact with plate VII, VIII one of the two grids receives the potential of the plate which is a combination of the constant and the alternating potential.

Although a specific embodiment of the invention has been illustrated and described for purposes of explanation it is not intended that the invention should be limited to the particular disclosure but only to the extent specified in the following claims:

1. A telegraphic signalling system comprising a plurality of vacuum tubes having a cathode, an anode, and a grid, the anode circuits containing the field windings of a dynamo electric generator, generators of direct and alternating electromotive forces to be impressed upon the anode and the grid circuits of said vacuum tubes, and movable contacts in said grid circuits with means for impressing by said contacts a biasing potential upon the grids during a definite phase-interval of the alternator.

2. Means for generating positive or negative electrical pulses by impressing, during its predetermined phase-interval a periodically fluctuating potential upon the grids of a plurality of vacuum tubes, the anode circuits of which contain the field coils of a pulse generator, and means for transmitting the electrical pulses of this generator to a telegraphic signalling system.

3. Means for transmitting electrical pulses in a telegraph system comprising a direct current generator having a field adapted to be excited by an external source, a thermionic vacuum tube having a cathode, grid, and anode, a source of direct current electrical energy for the thermionic current in the tubes, the winding of the said field being included in the anode circuit of said tube, and means comprising a source of constant potential, a source of alternating potential, the two potentials being superimposed upon each other and forming components of a fluctuating potential, and a movable contact in the grid circuit so adjusted that it will impress upon said grid the fluctuating potential during a predetermined phase-interval of its fluctuations.

4. In a duplex submarine cable system a plurality of vacuum tubes, each having a cathode, grid, and anode, a direct current generator having two field windings, each winding opposing the other and being connected in the anode circuit of one of said tubes, a generator of fluctuating electromotive forces consisting of an alternating electromotive force or of the superposition of a direct upon an alternating electromotive force and means of applying, during a predetermined phase-interval of these fluctuations, pulses from said generator to the grid circuits of either tube.

5. In a telegraphic signalling system, means for transmitting electrical pulses, comprising a direct current generator having a field adapted to be excited by an external source and means for controlling the excitation of that field comprising a generator of periodically fluctuating electromotive force, a plurality of vacuum tubes and means for applying said fluctuating electromotive force to the electrodes of said vacuum tubes for a predetermined phase-interval of said fluctuations.

6. In a telegraphic signalling system, means for applying periodically fluctuating electromotive force to the electrodes of a plurality of vacuum tubes for a predetermined phase-interval of the fluctuations, comprising a generator of fluctuating electromotive force, transmitting tape synchronized with said generator and movable contacts controlled by said transmitting tape and in adjustable relation to the phase of the fluctuating electromotive force.

7. In a telegraphic signalling system, means for transmitting electrical pulses, comprising a direct current generator having a field adapted to be excited by an external source and means for controlling the excitation of that field comprising a generator of fluctuating electromotive force, a plurality of vacuum tubes and means for applying said fluctuating electromotive force to the grids of said vacuum tubes for a predetermined phase-interval, said fluctuating electromotive force consisting of an alternating electromotive force or of the superposition of a direct upon an alternating electromotive force.

8. In a telegraphic signalling system, means for transmitting electrical pulses, comprising a direct current generator having a field adapted to be excited by an external source, means for controlling the excitation of that field comprising a plurality of vacuum tubes, the winding of said field being included in the anode circuits of said tubes and means for applying fluctuating potential to the grids of said tubes for a predetermined phase-interval.

9. In a telegraphic signalling system, means for transmitting electrical pulses, comprising a direct current generator having two field windings adapted to be excited by an external source, each of said windings opposing the other and being connected in the anode circuits of said tubes, and means for applying fluctuating potential to the grids of said tubes for a predetermined phase-interval.

10. In a telegraphic signalling system, means for transmitting electrical pulses comprising a direct current generator having a field adapted to be excited by an external source, a plurality of thermionic tubes having a cathode, grid and anode, a source of direct current electrical energy for the thermionic current in the tubes, said generator field consisting of a plurality of windings included in the anode circuits of said tubes and means for applying fluctuating potential to the grids of said tubes for a predetermined phase-interval.

11. The method of generating positive or negative electrical pulses which comprises impressing a periodically fluctuating potential upon the electrodes of a plurality of vacuum tubes for a predetermined phase-interval of the potential fluctuation, impressing the current thus caused to flow in the anode circuits of said tubes upon the field coils of a pulse generator, and transmitting the electrical pulses produced by this generator to a telegraphic signalling system.

MICHAEL IDVORSKY PUPIN.